United States Patent
Fastert et al.

(10) Patent No.: US 10,173,377 B2
(45) Date of Patent: Jan. 8, 2019

(54) LAYING DEVICE AND LAYING METHOD FOR PRODUCING A FIBER COMPOSITE SCRIM FOR FORMING A FIBER COMPOSITE COMPONENT

(71) Applicant: AIRBUS OPERATIONS GMBH, Hamburg (DE)

(72) Inventors: Claus Fastert, Hamburg (DE); Mohamed-Mourad Sayeh, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/242,042

(22) Filed: Aug. 19, 2016

(65) Prior Publication Data

US 2017/0050391 A1 Feb. 23, 2017

(30) Foreign Application Priority Data

Aug. 20, 2015 (DE) .......................... 10 2015 215 936

(51) Int. Cl.
*B32B 41/00* (2006.01)
*B29C 70/34* (2006.01)
(Continued)

(52) U.S. Cl.
CPC .............. *B29C 70/34* (2013.01); *B29C 43/58* (2013.01); *B29C 69/001* (2013.01);
(Continued)

(58) Field of Classification Search
CPC ....... B29C 70/34; B29C 43/58; B29C 69/001; B29C 70/388; B29C 2043/5808; B29K 2105/06
(Continued)

(56) References Cited

U.S. PATENT DOCUMENTS 8,733,417 B2 5/2014 Hamlyn et al.
2009/0229760 A1* 9/2009 Hamlyn ................ B29C 70/384
156/433
2010/0252183 A1 10/2010 Munaux et al.

FOREIGN PATENT DOCUMENTS

DE  20 2014 101 387 U1  6/2015
EP      2 036 702 B1     3/2009
(Continued)

OTHER PUBLICATIONS

German Search Report for DE 10 2015 215 936.1 dated Apr. 22, 2016.

(Continued)

*Primary Examiner* — Michael N Orlando
*Assistant Examiner* — Joshel Rivera
(74) *Attorney, Agent, or Firm* — Jenkins, Wilson, Taylor & Hunt, P.A.

(57) ABSTRACT

A fiber composite laying device for manufacturing a fiber composite scrim for forming a fiber composite component, includes a laying head, which is configured to supply a fiber composite band continuously in a supply region. A laying roller is configured to receive the fiber composite band from the supply region to unroll it towards a laying surface and to press it onto the laying surface in a laying region. A press is located between the supply region and the laying region and is configured to press the fiber composite band onto the laying roller in a pressing region. A cutter is configured to cut the fiber composite band to length between the supply region and the pressing region.

15 Claims, 2 Drawing Sheets

(51) Int. Cl.
    *B29C 70/38*     (2006.01)
    *B29C 43/58*     (2006.01)
    *B29C 69/00*     (2006.01)
    *B29K 105/06*     (2006.01)

(52) U.S. Cl.
    CPC .... *B29C 70/388* (2013.01); *B29C 2043/5808* (2013.01); *B29K 2105/06* (2013.01)

(58) Field of Classification Search
    USPC .......................... 156/64, 350, 351, 378, 379
    See application file for complete search history.

(56) References Cited

FOREIGN PATENT DOCUMENTS

| | | |
|---|---|---|
| ES | 2 253 005 A1 | 5/2006 |
| WO | WO 2005/077644 A2 | 8/2005 |

OTHER PUBLICATIONS

European Search Report for European Application No. 16 182 689.6 dated Feb. 27, 2017.

* cited by examiner

LAYING DEVICE AND LAYING METHOD FOR PRODUCING A FIBER COMPOSITE SCRIM FOR FORMING A FIBER COMPOSITE COMPONENT

CROSS-REFERENCE TO RELATED APPLICATION

This application claims priority to DE 10 2015 215 936.1 filed Aug. 20, 2015, the entire disclosure of which is incorporated by reference herein.

TECHNICAL FIELD

The present disclosure relates to a fiber composite laying method for producing a fiber composite scrim for forming a fiber composite component. The present disclosure further relates to a fiber composite laying device for producing a fiber composite scrim for forming a fiber composite component. In particular, the present disclosure relates to the planar laying of fiber composite scrims having a fiber orientation that is curved within the laying surface.

BACKGROUND

Although it can be used to produce a wide range of fiber composite scrims and fiber composite components in various applications, the present disclosure and the problems on which it is based are described in greater detail in relation to the production of curved supporting or secondary aircraft structures, in particular annular formers or annular former segments or other complex curved profiles.

In modern aircraft construction, supporting or structurally reinforcing components are increasingly being made of fiber composite materials such as carbon-fiber-reinforced plastics material (CFRP). For example, a typical aircraft fuselage is subdivided in the longitudinal direction into a plurality of barrel-shaped fuselage segments, which each comprise annularly curved formers extending in the circumferential direction. The formers may in turn be composed of annular former segments. Producing such curved components of large dimensions from composite materials can be a challenge in view of the complex shapes. So, for example when CFRP components are produced, a profile comprising pre-impregnated fibers, fiber strips and/or fibers bands, which is curved to some extent in a radial direction, may need to be rolled up. Different extensions of the profile in a radially internal region and a radially external region can be compensated for by a corresponding curved arrangement of the fibers, in such a way that folds, overlaps or gaps in the laid fiber scrim are prevented.

A widespread fully automated manufacturing process for composite components of this type is automated fiber placement (AFP), in which fiber-reinforced bands are laid, with or without a plastics material matrix or other materials, along a predetermined path on a tool surface using pressure and heat, by a laying head which may be robotically guided. A device of this type is disclosed for example in EP 2 036 702 B1. Typically, a laying head of this type comprises a laying roller, by which one or more fiber composite bands are unrolled continuously onto a laying surface whilst applying pressure and heat, and optionally cut to length at predetermined end points using a cutting tool. A cutting tool of this type is often arranged in the region of the laying roller, in particular above it with respect to the laying surface. The distance of the cutting tool from the laying point thus determines a minimum cutting length of the end piece of the fiber composite band with respect to the laying point.

The fiber composite bands may be laid in the laying surface so as to be straight or curved. If they are laid so as to be curved, the fiber composite material may be orientated in a predetermined orientation, for example under the pressure of the laying roller and the material tension. If the fiber composite band is cut to length using the cutting tool in this case, the material tension in the as yet unlaid end piece of the fiber composite band can cease to be applied over a length corresponding to the minimum cutting length. So as to prevent deviations from the predetermined web guidance and irregularities in the laid fiber material, the fiber composite bands are sometimes deliberately laid past the actual end region and cut to length so as to protrude. Resulting excess material can subsequently be cut off.

SUMMARY

One of the ideas of the present disclosure is to provide improved solutions for gap-free, curved laying of fiber composite materials in which no excess material occurs.

Accordingly, a fiber composite laying method for producing a fiber composite scrim for forming a fiber composite component is provided. The fiber composite laying method comprises the step of supplying a fiber composite band in a supply region of a laying head. The fiber composite laying method further comprises the step of unrolling the supplied fiber composite band using a laying roller. The fiber composite laying method further comprises pressing the unrolled fiber composite band onto a laying surface in a laying region using the laying roller. The fiber composite laying method further comprises the step of pressing the supplied fiber composite band onto the laying roller in a pressing region using a press. The pressing region is arranged between the supply region and the laying region. The fiber composite laying method further comprises the step of cutting the fiber composite band to length between the supply region and the pressing region using a cutter.

Further, a fiber composite laying device for producing a fiber composite scrim for forming a fiber composite component is provided. The fiber composite laying device comprises a laying head, which is configured to supply a fiber composite band continuously in a supply region. The fiber composite laying device further comprises a laying roller, which is configured to receive the fiber composite band from the supply region, to unroll it towards a laying surface, and to press it onto the laying surface in a laying region. The fiber composite laying device further comprises a press which is located between the supply region and the laying region and which is configured to press the fiber composite band onto the laying roller in a pressing region. The fiber composite laying device further comprises a cutter which is configured to cut the fiber composite band to length between the supply region and the pressing region.

A concept underlying the present disclosure involves providing (curved) web guidance of a laid fiber composite band even after cutting it to length, by additionally fixing and tautening the fiber composite band using the press. The press can be pressed on permanently or temporarily. For example, the laying device according to the disclosure herein may lay fiber composite bands in a known manner, the press only being activated shortly before each fiber composite band is cut to length. Once the fiber composite band which has been cut to length is fully laid, this now taking place in a completely controlled, guided manner by virtue of the press, the press can be deactivated again.

Alternatively, however, the press may also for example be activated permanently. The solution according to the disclosure herein has the major advantage that fiber composite bands can be laid so as to be curved in a guided and controlled manner, without excess material occurring or further steps subsequently being required to bring the fiber composite bands into the desired arrangement.

The fiber composite laying device according to the present disclosure can be integrated into an AFP device or the like, for example an AFP laying head. In principle, it is conceivable to retrofit existing AFP devices. In this case, a press could be provided separately.

Fiber composite bands according to the present disclosure are planar bands or band-shaped arrangements of fibers and the associated composite material. For example, a fiber composite band within the meaning of the present disclosure may be a prepreg, in other words a textile semi-finished product pre-impregnated with resin. Alternatively, however, the disclosure herein also provides fiber composite bands having dry fibers (dry fiber placement), in which a composite material, for example a thermoplastic, integrated in the fibers is only subsequently liquefied under the effect of heat to connect the fibers. Fiber composite bands according to the disclosure herein also include in particular strips, sheets, tows, tapes (which may in turn consist of or comprise one or more tows arranged side by side, for example 4 to 32 tows) or similar band-like arrangements of fibers. For example, they may be plastics material bands which are penetrated by carbon fibers in a longitudinal direction. The fibers contained may be in the form of a pure unidirectional layer, but also in principle in the form of a woven fabric or scrim or the like.

Advantageous embodiments and developments may be derived from the further, dependent claims and from the description with reference to the drawings.

In a development, the pressing may be carried out using a contact pressure. The fiber composite laying method may further comprise the step of monitoring the contact pressure. Monitoring the contact pressure makes possible targeted prevention of damage to the laid fiber composite bands. For example, the laying or pressing can be stopped at any time when the contact pressure exceeds and/or falls below predetermined thresholds.

The fiber composite laying method may further comprise the step of controlling the contact pressure. Depending on the desired laying of the fiber composite bands or depending on what requirements arise from the shape of the fiber composite scrim to be produced, in this development the contact pressure of the press can be varied at any time. For example, the fiber composite laying device may comprise a control. The control may be configured to detect, evaluate and control the instantaneous contact pressure. For this purpose, the control may for example comprise and/or be coupled to a pressure sensor. The pressure sensor may for example be provided in the contact and may be electrical. The control itself may for example contain a microprocessor or the like, which is electrically connected to the pressure sensor. To control the contact pressure, the press may for example contain an active brake or the like, which can be controlled by the control and by which the contact pressure can be adjusted.

The contact pressure may be generated mechanically, hydraulically and/or pneumatically. Accordingly, the press may be configured to generate a contact pressure mechanically, hydraulically and/or pneumatically.

In a development, the contact region may be located in the direct vicinity of the laying region. In this context, direct vicinity means that the press can be guided as closely as possible towards the laying region of the laying roll (in so far as the geometric constraints allow this). The shorter the distance between the laying region and the pressing region, the more specifically and precisely the laying of the fiber composite band can be controlled.

In a development, the press may be formed as an actuator. The actuator may be formed to have a movable pressing surface.

In a development, the pressing surface may form the surface of a roller. In this case, the roller may be rotatable counter to the laying roller, so as to move the fiber composite band between the press and the laying roller in the direction of the laying surface during pressing.

In a development, the pressing surface may be formed as a portion of a cylinder outer surface. The portion of the cylinder outer surface may be shaped so as to be complementary to a surface portion of the laying roller. In this development, the press may act to some extent as a "stamp", which is temporarily pressed onto the fiber composite band so as to press it against the laying roller.

In a development, the press may be displaceable towards and away from the laying roller automatically. In a development the press may be fixed to a lever arm so as to be pivotable towards the laying roller for the pressing. Correspondingly, the laying roller may also be fixed to a lever arm. So, for example, embodiments of the disclosure herein are provided in which the press is provided in addition to the laying head and to the side thereof, and can be displaced towards and away therefrom. Alternatively, it may also be possible for both the laying roller and a pressing roller to be coupled to a laying head of the fiber composite laying device using respective connecting arms.

In a development, the pressing surface and the laying roller are made of the same material at least at the surface. If a segmented laying roller is used, in particular the press may be formed so as to be correspondingly segmented. In this respect, the surfaces of the two means, in other words the press (for example a roller) and the laying roller, can be coordinated with one another in geometric configuration or material constitution. The use of the same surface material would mean for example that the pressing roller and the laying roller could have the same service intervals. Accordingly, they could also be maintained and/or replaced in an integrated manner.

In a development, the laying roller and/or the press may be provided with lateral guide elements which fix the fiber composite band in an unrolling orientation. For example, they may be a pair of flange-like lateral belts or webs or the like, between which the fiber composite band is laterally held.

The above embodiments and developments can be combined with one another as desired, within reason. Further possible embodiments, developments and implementations of the disclosure herein also include combinations which are not explicitly mentioned of features of the disclosure herein described above or below in relation to the embodiments. In particular, a person skilled in the art will also add individual aspects to each basic form of the present disclosure as improvements or additions.

BRIEF DESCRIPTION OF THE DRAWINGS

In the following, the present disclosure is described in greater detail on the basis of the embodiments set out in the schematic drawings, in which.

DETAILED DESCRIPTION

Figure 1:
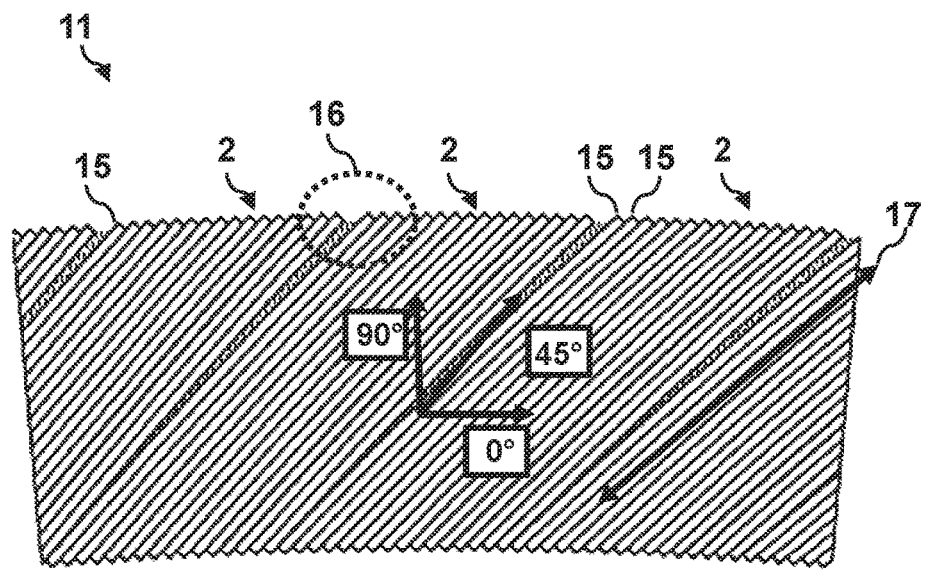
FIG. 1 is a schematic plan view of a portion of an example fiber composite scrim.

The accompanying drawings are intended to convey greater understanding of the embodiments of the disclosure herein. They illustrate embodiments and serve to describe principles and concepts of the disclosure herein in connection with the description. Other embodiments and many of the stated advantages can be derived from the drawings. The elements of the drawings are not necessarily to scale.

In the drawings, like, functionally like and identically operating elements, features and components are provided with like reference numerals in each case, unless stated otherwise.

FIG. 1 is a schematic plan view of a detail of an example fiber composite scrim.

In FIG. 1, reference numeral 11 denotes a fiber composite scrim. The fiber composite scrim 11 consists of or comprises a plurality of fiber composite bands 2, which in turn each comprise for example 16 fiber composite tows 15. Fiber composite tows 15 of this type typically have a laying width of several millimeters to several centimeters. The detail in FIG. 1 may for example be a radially external portion of a fiber composite scrim 11 for producing an annular former. For example, the upper face of the fiber composite scrim 11 in FIG. 1 may be positioned radially externally. Laying a fiber composite scrim 11 of this type in a flat, planar arrangement may for example be the first step in producing a three-dimensionally curved annular former. In a further method step, the planar fiber composite scrim 11 may be brought into a desired profile shape by a mould core before it is finally cured.

The fiber composite scrim 11 may for example have been produced using an AFP (automated fiber placement) device or the like, as was described in the introduction. The individual fiber composite bands 2 of the fiber composite scrim 11 are laid so as to be curved, in other words are not arranged so as to be straight at an exactly maintained orientation angle, but instead orientated so as to be slightly bent. A curved orientation of this type is typically advantageous for manufacturing curved fiber composite components, such as formers or the like, so as to compensate for the different extensions of the components by virtue of the curvature.

FIG. 1 shows laying gaps 16 between the individual fiber composite bands 2 by way of example. These laying gaps 16 widen radially outwards, in other words upwards, in FIG. 1. As was described in the introduction, laying gaps 16 of this type may occur when fiber composite bands 2 are laid so as to be curved using conventional AFP devices if the fiber composite bands 2 are no longer fully under the control, in other words the guidance, of the AFP device after being cut to length. In this case, laying gaps 16 may occur over a length which approximately corresponds to a minimum cutting length 17 of the AFP device. In this context, a typical minimum cutting length 17 is in the range of from 50 to 100 mm, it being entirely possible for angular deviations in the positions of the fiber composite bands of up to a few degrees to occur, corresponding to a gap width of a few millimeters.

Figure 2:
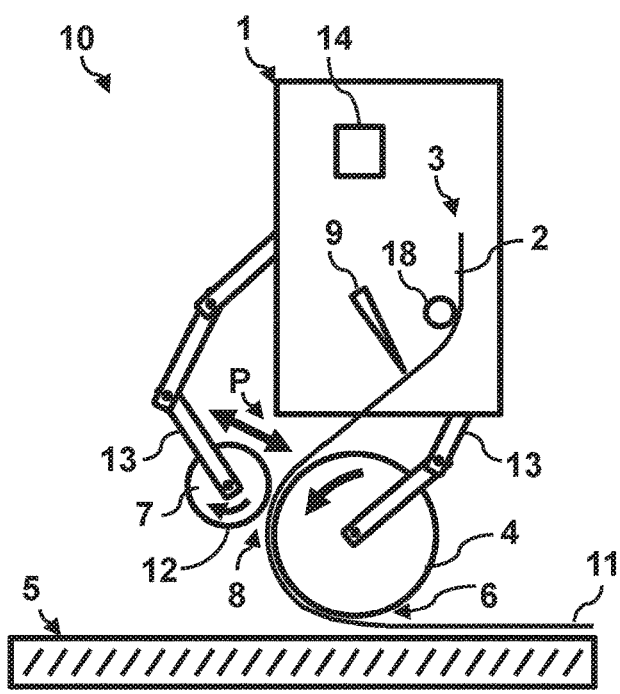
FIG. 2 is a schematic cross-sectional view of a fiber composite laying device for producing a fiber composite scrim for forming a fiber composite component in accordance with an embodiment of the disclosure herein.

FIG. 2 is a schematic cross-sectional view of a fiber composite laying device 10 for producing a fiber composite scrim 11 for forming a fiber composite component in accordance with an embodiment of the disclosure herein.

The fiber composite laying device 10 may be an AFP device or the like or be integrated into an AFP device or the like. The fiber composite laying device 10 basically comprises four components: a laying head 1, a laying roller 4, a pressing device 7 and a cutter 9.

The laying head 1 is configured to supply a fiber composite band 2 continuously in a supply region 3. The fiber composite band 2 may be moved onwards from the supply region 3 by way of guide rollers 18 or the like, until it is received by the laying roller 4. The laying roller 4 is configured to unroll the fiber composite band 2 towards a laying surface 5 (as indicated by an arrow in FIG. 2) and press it onto the laying surface 5 in a laying region 6. As well as an application of pressure, the pressing process may also include a simultaneous or offset application of heat (omitted here for reasons of clarity), as is known to a person skilled in the art from other AFP devices or the like, so as to form a fiber scrim 11. The cutter 9 is further configured to cut the fiber composite band 2 to length between the supply region 3 and a pressing region 8 if appropriate.

In this embodiment of the disclosure herein, a press 7 is provided, which is located between the supply region 3 and the laying region 6 and is configured to press the fiber composite band 2 onto the laying roller 4 in the pressing region 8 at a contact pressure P. The press 7 may for example be an actuator or the like which makes possible the automatic back-and-forth displacement of the press 7 towards the laying roller 4. An actuator of this type may be formed with a movable pressing surface 12. In the present embodiment, the pressing surface 12 forms the surface of a roller. This roller is rotatable counter to the laying roller 4. This means that the axes of the two rollers are arranged in parallel (perpendicularly to the plane of the drawing in FIG. 2) and rotate in opposite directions. The fiber composite band 2 is thus moved from the supply region 3 over the guide rollers 18 past the cutter 9 to the laying roller 4 in the pressing region 8. During the pressing, the fiber composite band 2 is moved between the press 7 and the laying roller 4 in the direction of the laying surface 5. If the press 7 is not activated, the fiber composite band 2 is moved towards the laying surface 5 merely by the rotation of the laying roller 4. Both the press 7 and the laying roller 4 are connected to the laying head 1 via lever arms 13. For example, these may be mechanically, hydraulically and/or pneumatically driven lever arms 13, which are controlled by the laying head 1 and/or the fiber composite laying device 10. As a basic principle, the embodiment shown in FIG. 2 provides a control 14 which is integrated into the laying head 1 of the fiber composite laying device 10. The control 14 may be connected to a pressure sensor and may be configured to detect, evaluate and control the instantaneous contact pressure P. Further, the control 14 may be configured to control the lever arms 13, in other words in particular the position of the press 7 and the laying roller 4. In principle, the control 14 may be a central control of the fiber composite laying device 10, which monitors and controls all aspects of the automatic laying process, in other words in particular the rotation and position of the press 7, the contact pressure P, the rotation and position of the laying roller 4, and the pressing of the fiber composite band 2 onto the laying surface 5 (in other words pressure and temperature).

Thus, in this example embodiment of the disclosure herein, a typical laying process for a fiber composite band 2 may proceed as follows. The laying head 1 continuously feeds the fiber composite band 2, which is applied to the laying surface 5 by the laying roller 4. The press 7 is not activated at this stage, in other words no contact pressure P is applied to the fiber composite band 2 in the pressing region 8. Shortly before the laid fiber composite band 2 has reached the desired length, the press 7 is activated, displaced towards the laying roller 4, and pressed against the roller at a contact pressure P. The contact pressure P is continuously or discretely detected, evaluated and optionally controlled by the control 14. Next, the fiber composite band 2 is cut to length by the cutter 9. Once the fiber composite band has been laid completely on the laying surface 5, the press 7 is deactivated again and displaced away from the laying roller 4, in such a way that a new fiber composite band 2 can be supplied.

Figure 3:
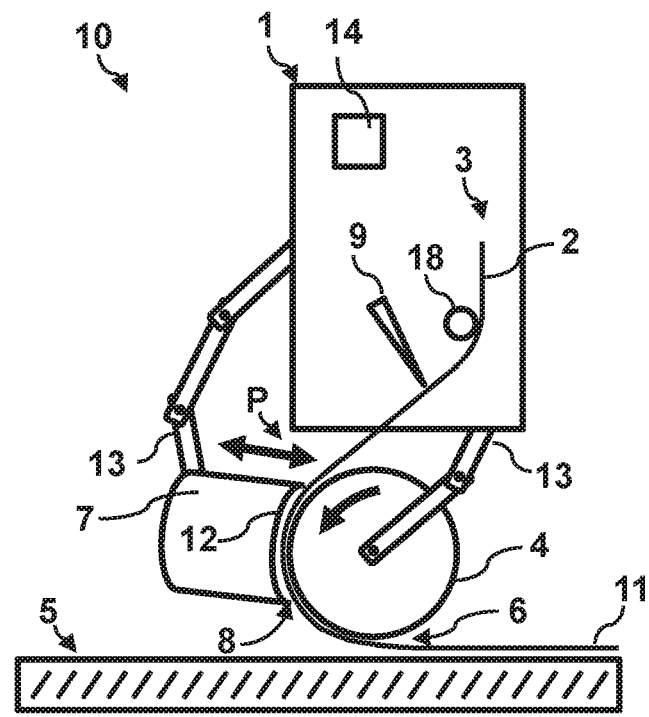
FIG. 3 is a schematic cross-sectional view of a fiber composite laying device in accordance with an alternative embodiment of the disclosure herein.

FIG. 3 is a schematic cross-sectional view of a fiber composite laying device 10 in accordance with an alternative embodiment of the disclosure herein.

The fiber composite laying device 10 may for example be constructed similarly to that in FIG. 2. Thus, it may also be formed as an AFP device or the like and may contain a laying head 1, a laying roller 4, a pressing device 7 and a cutter 9 corresponding to those in FIG. 2. Unlike in the embodiment of FIG. 2, however, in this case the press 7 is not formed as a roller. Instead, the pressing surface 12 is formed as a portion of a cylinder outer surface, which is shaped so as to be complementary to a surface portion of the laying roller 4 (see FIG. 3). In principle, however, the functionality of the press 7 is similar to that of FIG. 2 regardless. To generate a contact pressure P, the pressing surface of the press 7 is pressed against the fiber composite band 2 and thus against the laying roller 4. This may be provided for example shortly before the fiber composite band 2 is cut to length using the cutter 9.

Figure 4:
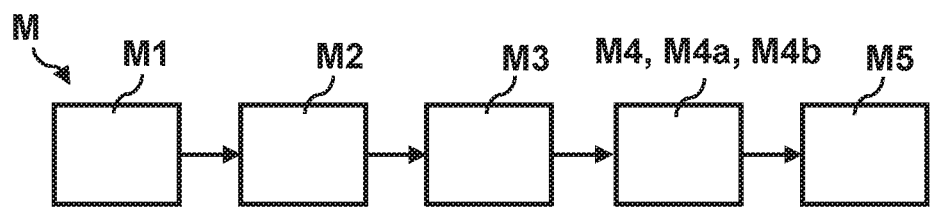
FIG. 4 is a schematic flow chart of a fiber composite laying method for producing a fiber composite scrim for forming a fiber composite component in accordance with another embodiment of the disclosure herein.

FIG. 4 is a schematic flow chart of a fiber composite laying method M for manufacturing a fiber composite scrim 11 for forming a fiber composite component in accordance with another embodiment of the disclosure herein.

The laying method M comprises at M1 the step of supplying a fiber composite band 2 in a supply region 3 of a laying head 1. The laying method further comprises at M2 the step of unrolling the supplied fiber composite band 2 using a laying roller 4. The laying method further comprises at M3 the step of pressing M3 the unrolled fiber composite band 2 onto a laying surface 5 in a laying region 6 using the laying roller 4. The laying method further comprises at M4 the step of pressing M4 the supplied fiber composite band 2 onto the laying roller 4 in a pressing region 8 using a press 7. In this context, the pressing region 8 is arranged between the supply region 3 and the laying region 6.

Optionally, the pressing at M4 may be carried out using a contact pressure P, and the fiber composite laying method M may further comprise at M4a the step of monitoring the contact pressure P. The fiber composite laying method M may further comprise at M4a the step of controlling the contact pressure P.

Finally, the laying method M in FIG. 4 comprises at M5 the step of cutting M5 the fiber composite band 2 to length between the supply region 3 and the pressing region 8 using a cutter 9.

The described method and devices may be used in particular in all fields of the transport industry, for example for road motor vehicles, for rail vehicles, for aircraft or for watercraft, but also in general in engineering and mechanical engineering.

In the above detailed description, various features have been combined in one or more examples to improve the accuracy of the explanation. However, it should nevertheless be clear that the above description is merely illustrative and in no way limiting in nature. It is intended to cover all alternatives, modifications and equivalents of the various features and embodiments. Many other examples will be immediately and directly apparent to a person skilled in the art from the above description in view of his expert knowledge.

The embodiments have been selected and disclosed so as to be able to explain the principles underlying the invention and the possible practical applications thereof. This makes it possible for persons skilled in the art to modify and use the invention and the various embodiments thereof in an optimal manner for the intended purpose of use. In the claims and description, the terms "containing" and "having" are used as neutral terminology for the corresponding term "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A fiber composite laying method for producing a fiber composite scrim for forming a fiber composite component, the method comprising:
   supplying a fiber composite band in a supply region of a laying head;
   unrolling the fiber composite band using a laying roller;
   pressing the unrolled fiber composite band onto a laying surface in a laying region using the laying roller;
   pressing the fiber composite band onto the laying roller in a pressing region using a press, the pressing region being arranged between the supply region and the laying region; and
   cutting the fiber composite band to length between the supply region and the pressing region using a cutter.

2. The method of claim 1, wherein the pressing is carried out using a contact pressure, the method further comprising monitoring the contact pressure.

3. The method of claim 2, further comprising controlling the contact pressure.

4. The method of claim 2, wherein the contact pressure is generated mechanically, hydraulically and/or pneumatically.

5. The method of claim 1, wherein the pressing region is located in a direct vicinity of the laying region.

6. A fiber composite laying device for manufacturing a fiber composite scrim for forming a fiber composite component, the device comprising:

a laying head configured to supply a fiber composite band continuously in a supply region;

a laying roller configured to receive the fiber composite band from the supply region, to unroll the fiber composite band towards a laying surface, and to press the fiber composite band onto the laying surface in a laying region;

a press located between the supply region and the laying region and configured to press the fiber composite band onto the laying roller in a pressing region; and a cutter configured to cut the fiber composite band to length between the supply region and the pressing region.

7. The fiber composite laying device of claim 6, wherein the press is formed as an actuator formed with a movable pressing surface.

8. The fiber composite laying device of claim 6, wherein the pressing surface forms a surface of a roller, which is rotatable counter to the laying roller, so as to move the fiber composite band between the press and the laying roller in a direction of the laying surface during pressing.

9. The fiber composite laying device of claim 6, wherein the pressing surface is formed as a portion of a cylinder outer surface, which is shaped so as to be complementary to a surface portion of the laying roller.

10. The fiber composite laying device of claim 6, wherein the press is displaceable towards and away from the laying roller automatically.

11. The fiber composite laying device of claim 6, wherein the pressing surface and the laying roller are made of the same material at least at the surface.

12. The fiber composite laying device of claim 6, wherein the press is fixed to a lever arm so as to be pivotable towards the laying roller for the pressing.

13. The fiber composite laying device of claim 6, wherein the press is configured to generate a contact pressure mechanically, hydraulically and/or pneumatically.

14. The fiber composite laying device of claim 13, further comprising:

a control configured to detect, evaluate and control instantaneous contact pressure.

15. The fiber composite laying device of claim 6, wherein the laying roller and/or the press are provided with lateral guide elements which fix the fiber composite band in an unrolling orientation.

* * * * *